United States Patent Office 3,838,008
Patented Sept. 24, 1974

3,838,008
STEREOSELECTIVE PREPARATION OF L-DOPA
AND L-M-TYROSINE AND NOVEL COMPOUNDS
Peter Bamberg, Enhorna, and Berndt Olof Harald Sjoberg, Sodertalje, Sweden, assignors to Astra Lakemedel Aktiebolag, Sodertalje, Sweden
No Drawing. Filed Jan. 15, 1971, Ser. No. 106,894
Claims priority, application Sweden, Jan. 19, 1970, 615/70; June 25, 1971, 8,835/70, 8,836/70
Int. Cl. C12d 1/00
U.S. Cl. 195—29                 11 Claims

ABSTRACT OF THE DISCLOSURE

A method is described for the stereoselective preparation of L-Dopa and L-m-tyrosine and novel compounds in which the hydroxy groups of L-Dopa or L-m-tyrosine are substituted. The reaction is characterized by the use of stereoselectivity active acylase prepared from E. coli which is used to treat a precursor of the desired compound.

This invention relates to L-Dopa and L-m-tyrosine and to certain novel compounds, and particularly to a process for the preparation of these substances and to intermediates intended to be used in such a process. L-Dopa has been proved to be useful against Parkinson's disease and L-meta-tyrosine, which is structurally closely related to L-Dopa and its derivatives, appears to exhibit such properties that it may also be used as a starting material for this purpose. Different explanations as to how L-Dopa acts in the treatment of Parkinson's disease have been proposed. The explanation which is accepted by the majority of researchers in this field is as follows: The pathophysiology of parkinsonism with man can be explained, at least partly, as a degeneration in the dopamine-neuron system of the brain localized to nucleus caudate, putamen and substantia nigra. A rational therapy then would consist in the replacement of the missing dopamine by administration from the outside. Unfortunately, administered dopamine is unable to pass the blood-brain barrier, and dopamine administered perorally or parenterally, therefore, does not reach the dopamine-neuron system.

Dihydroxyphenylalanine, which is the precursor of dopamine, does pass the blood-brain barrier and is decarboxylated in the brain to dopamine. Cotzias et al.* have shown that the racemic Dopa may have a beneficial effect on the Parkinson symptoms. However, side effects occured frequently. These could be diminished when L-Dopa was used. It is therefore recommended that as pure L-Dopa as possible be used in the therapy. Cotzias et al. also showed that L-Dopa is decarboxylated in the vascular system, wherefore large doses of L-Dopa are necessary to achieve the desired therapeutic effect.

L-Dopa may be administered perorally and is then administered in increasing doses from 100 mg. threee times daily up to a daily dose of 8 g. The treatment with L-Dopa has appeared to be particularly favorable with regard to the rigidity which characterizes Parkinson's disease.

L-Dopa is 3-(3,4-dihydroxyphenyl)-L-alanine of the structural formula

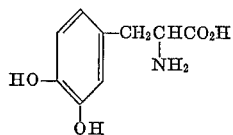

I

*New Engl. J. Med. 280 337 (1969).

L-m-tyrosine, 3-(3-hydroxyphenyl)-L-alanine, has the structural formula

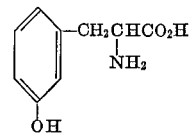

II

Of the two optical antipodes in which both these substances can be found, only the L forms have the desired effect.

Previously it was a great difficulty to obtain sufficient amounts of L isomer in pure form. According to the present invention, it has now surprisingly appeared to be possible to resolve stereoselectively certain N-acylaminoacid derivatives using an E. coli acylase in such a way that only the L-amino acid derivatives were deacylated. The starting material for the stereoselective resolution with E. coli acylase are compounds of the general formula

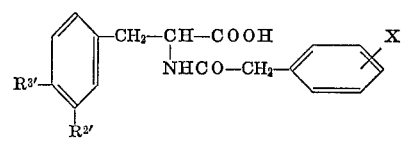

III wherein X is a member of the class consisting of hydrogen, fluorine, chlorine, bromine, and —$NO_2$; $R^{2'}$ is a member of the class consisting of hydroxy and alkoxy groups with not more than 5 carbon atoms such as —$OCH_3$, —$OC_2H_5$, —$OC_3H_7$; and wherein $R^{3'}$ is a member of the class consisting of hydrogen, hydroxy, and alkoxy groups with not more than 5 carbon atoms such as —$OCH_3$, —$OC_2H_5$, —$OC_3H_7$, or wherein $R^{2'}$ together with $R^{3'}$ designate an alkylenedioxy group with one or two carbon atoms.

The compounds of the formula III are stereoselectively resolved using an E. coli acylase to the formation of the L(—) form of the compounds of the formula

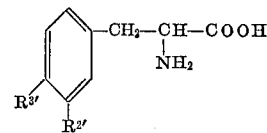

IV and therapeutically acceptable salts thereof, wherein $R^{2'}$ and $R^{3'}$ have the meaning specified above.

The invention also relates to compounds of the formula

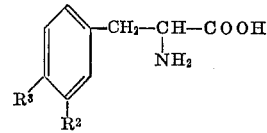

V in L-form, pharmaceutical preparations containing such compounds in L-form and the medicinal use of such compounds for treatment of parkinsonism, in which formula V $R^2$ is a member of the class consisting of hydroxy and alkoxy groups with not more than 5 carbon atoms such as —$OCH_3$, —$OC_2H_5$ and —$OC_3H_7$ and wherein $R^3$ is a member of the class consisting of hydrogen, hydroxy and alkoxy groups with not more than 5 carbon atoms such as —$OCH_3$, —$OC_2H_5$ and —$OC_3H_7$, provided that $R^3$ is hydrogen, hydroxy or alkoxy when $R^2$ is alkoxy and that $R^3$ is alkoxy when $R^2$ is hydroxy; or wherein $R^2$ together with $R^3$ designate an alkylenedioxy group with one or two carbon atoms.

The compounds of the formula III contain an asymmetric carbon atom and may occur in the form of racemate or in the form of optically active isomers.

The preparation of the racemic starting material of the formula III, which is used at the resolution with E. coli acylase, may be carried out according to the reaction scheme given below:

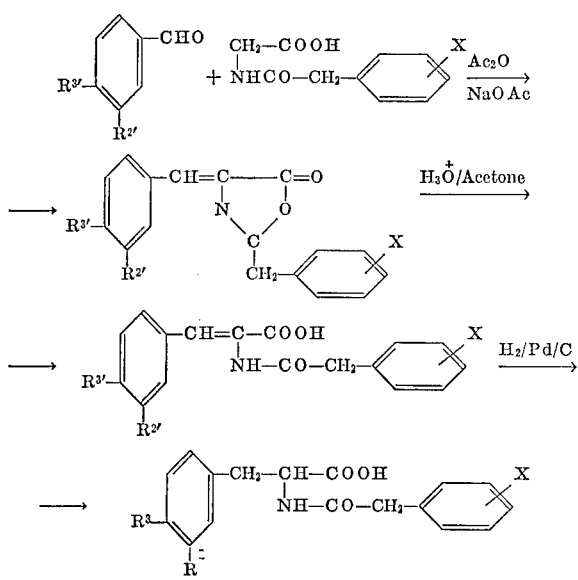

in which formulas X, R² and R³ have the meaning given above.

The resolution into the stereoisomeric antipodes of the starting material which is obtained according to the formula schemes given above is carried out by incubating the racemate obtained at a pH of about 6 to 8 with *E. coli* acylase during the necessary time interval, usually from about 1 hour to about 72 hours. Hereafter the pH value is lowered to between 1 and 3 whereupon nonreacted acylamino acid is extracted with ethyl acetate or other suitable solvents.

Illustrative examples of radicals of the formula

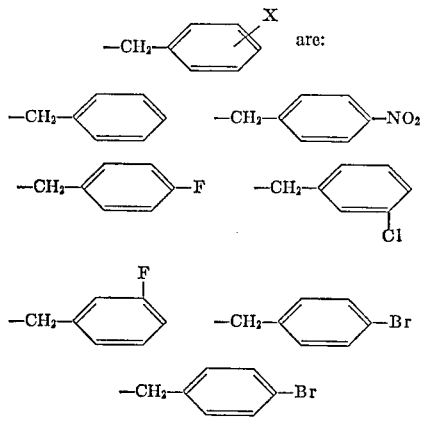

The acylase used in the process of this invention is obtained by cultivating *E. coli* under conditions suitable for producing stereospecifically acting acylase. Representative strains which may be used for this purpose include the *E. coli* ATCC 9637, ATCC 11105, BRL 1040, NCIB 9465 and Astra 1339. BRL stands for the Beecham Research Laboratory collection and NCIB stands for the National Collection of Industrial Bacteria, 135 Abbey Road, Aberdeen, United Kingdom. Other *E. coli* strains may be similarly employed as will be obvious to those of ordinary skill in the art.

The *E. coli* is cultured in a conventional manner. For example, very suitable cultures are prepared under aerobic submerged conditions in a conventional nutrient medium of assimilable sources of carbon, nitrogen and inorganic salts. A substance capable of inducing acylase synthesis is provided such as phenylacetic acid or derivatives thereof. Other representative substances inducing acylase synthesis are phenylacetylglycine and phenylacetamide.

The growth period is typically 20 to 50 hours. The growth temperature of about 28° C. is commonly used, and, as is known, the temperature of the culture medium is usually not allowed to exceed 31° C. The starting pH of the culture medium is about 6.5. Growth is ended at a pH of about 8.0 to 8.5.

Recovery of the enzyme from the fermentation broth is carried out in the usual manner. As is industrially known, suspensions of *E. coli* cells containing the acylase is frequently used. Bacterial extracts may also suitably be used.*

In the preferred enzyme preparations, the removal of the culture fluid and the expulsion of the cell material are effected simultaneously in a self-cleaning centrifugal separator, operated at a temperature between 0° and 50° C., preferably at 15° to 40° C., where the separated cell material intermittently is expelled within 0.05 to 1.0 seconds, preferably within 0.1 to 0.5 seconds, through a peripheral slit with a width of 0.1 to 1.5 mm., preferably 0.3 to 0.7 mm., by application of a pressure of 500 to 2,000 p.s.i., preferably 900 to 1,100 p.s.i. If desirable, the broth is saturated with an organic solvent having low solubility in water such as butylacetate, isobutylacetate or amyl acetate in order to kill the organism, and to aid the process in the separator. Likewise, it is possible, if desirable, to wash the cell material with water in the separator. The expelled cell material is stirred at 10° to 50° C., preferably at 20° to 40° C., for 0.10 to 5.0 hours, suitably 0.25 to 3.0 hours and preferably 0.25 to 1.0 hours, with an efficient stirrer to dissolve the enzyme, and possibly with addition in a concentration of 1.0 to 5.0 percent of a water-immiscible organic solvent such as methylisobutyl ketone, butylacetate, isobutylacetate, amyl acetate, benzene, toluene or chloroform. In order to facilitate the extraction of the enzyme from the expelled cell material, an inorganic base, such as sodium hydroxide, potassium hydroxide or ammonia, or a tertiary organic base such as triethylamine or N-ethylpiperidine, may be added to the mixture to adjust and sustain the pH at a value between 6.5 and 9.0, preferably between 7.0 and 8.5.

The enzyme solution thus obtained can, possible after dilution with water, be freed from any remaining cell material and other solid impurities by common processes such as filtration or centrifugation, and eventually by a combination of both processes and possibly with the addition of decolorizing, clarifying and filtering aid agents such as activated carbon, aluminia, cellulose powder, diatomaceous earth or other solid, weak adsorbing agents. One preferred method is to remove most of the cell material by centrifugation and to filter the supernatant.

Additional purification of the enzyme can be obtained by acidification of the aqueous solution to pH 3.0 to 6.0, preferably 4.0 to 5.0, and then adjusting the solution to pH 7.0 to 8.5 with removal of the precipitated inactive material by filtration after each adjustment of pH and finally readjusting the pH to its original value.

The acylase contained in the cell-free, and if desired, partly purified, aqueous solutions referred to above, can be precipitated by treatment of the solutions with agents, like tannins, which form sparingly-soluble complexes with proteins. In one preferred form of this process, the enzyme solution is treated at pH 4 to 6, suitably at pH 4.5 to 5.5, with tannin to a final concentration of 300 to 900 p.p.m. in the presence of chelating agents, like ethylene diamine tetraacetic acid, forming complexes with iron ions. The enzyme-tannin complex formed may be isolated in a com-

---

*For representative proposals for preparing such extracts see Borkar et al., *Hindustan Antibiotics Bull.*, V. 4 (1961) pages 48, 152; Holt and Stewart, *Nature*, V. 201 (1964) page 824; Szentirmai, *Acta Microb. Acad. Scient. Hung.*, V. 12 (1966) page 395; Sakaguchi and Marao, Japanese Pat. 26,-050/64; Johnson and Hardcastle, U.S. Pat. 3,297,546; Duerre and Ribi, *Appl. Microbiol.*, V. 11 (1964) page 467; and Frazer, *Nature*, V. 167 (1951), page 33.

mon way, e.g., by filtration or centrifugation. It may be washed and dried and freed of water, e.g., by drying, especially by freeze-drying, or by treatment with water-miscible organic solvents like acetone.

The acylase contained in the tannin precipitate may be released into aqueous solution by dissolution of the complex in water at pH 7 to 9, preferably 7.5 to 8.5. Alternatively, the complex may be treated with a mixture of water and a water-immiscible solvent like n-butanol at pH 4 to 7, preferably 4.5 to 5.5. A third method of removing the tannin consists in treating the enzyme-tannin complex, suspended in water with an anionic ion exchanger, like DEAE-cellulose, which binds the tannin and releases the enzyme into water. The amounts of water necessary for these operations are far less than those present in the original enzyme solutions and in this way a considerable concentration of enzymatic activity is achieved.

The acylase contained in any solution referred to above may be concentrated and purified with the aid of an ion exchanger. In a preferred form, the enzyme is adsorbed on a cationic ion exchanger with an open structure such as SE-Sephadex®, CM-cellulose or CM-Sephadex® by passing the solution of the enzyme adjusted to pH 3.5 to 6, preferably 4.0 to 5.0, through a column of the exchanger. Alternatively, the exchanger may be added to the stirred enzyme solution. The acylase can be released from the ion-exchanger by elution at pH 6.0 to 8.0 with weak buffer solutions such as 0.2 M ammonium acetate or trishydroxymethylammonium acetate.

In order to get purer preparations of the enzyme, inorganic ions and low molecular weight impurities can be removed from the enzyme solutions by dialyzation against water. Alternatively, the solutions, if necessary, after concentration by evaporation at a temperature below 50° C. to a suitable concentration of 25 to 100 mg. dry weight per ml., are submitted to gel filtration. The stereoselectively acting acylase in the foregoing preparation is not isolated in the pure form for purposes of the present invention. The acylase activity of the culture broth is suitably assayed by measuring the initial rate of hydrolysis of Penicillin G at constant pH.

The acylase preparations are used in the present invention to prepare L-Dopa, L-m-tyrosine, or other compounds of the present invention by digestion of the appropriate precursor as described above. The pH is suitably between 6 and 8. The digestion time may be from 1 to 72 hours, and preferably not more than 20 hours. The concentration of the precursor is from 0.001 to 1 mole per liter of reaction solution. Best results are obtained when the concentration of the precursor is between about 0.05 and 0.5 molar. The digestion temperature may range between 0 and 60° C., and preferably is between about 20° and 50° C.

EXAMPLE 1

Production of E. coli bacterial cells

Corn steep liquor (3 kg)., soybean oil (135 ml.), paraffin (12 ml.) and cetanol (3 ml.) in water (150 l.) was adjusted to pH 6.0 with 45 percent sodium hydroxide (165 ml.) and then sterilized at 124° C. for 30 minutes in a fermentation seed tank. The solution was inoculated with 100 ml. of a 20-to-24-hour culture of E. coli (Astra 1339) and incubated at 25° C. with aeration and agitation for 18 hours.

Corn steep liquor (300 kg.), soybean oil (13.8 kg.), paraffin (1.22 kg.), cetanol (0.3 kg.), phenylacetic acid (21 kg.) and sodium chloride (112 kg.) in water (14,000 l.) was adjusted to pH 6.6 with 45 percent sodium hydroxide (40 kg.) and the solution sterilized in a fermentation tank at 124° C. for 30 minutes. The solution was cooled and inoculated with the above-mentioned seed culture and subsequently incubated at 25° C. with agitation and aeration. Twenty-four hours after the inoculation and when the pH had risen to 8.2, the bacterial cells were killed by the addition of butyl acetate (180 l.) and the mixture was subsequently cooled.

EXAMPLE 2

Isolation and purifiation of acylase

For isolation of the bacterial mass the mixture was separated in a self-cleaning centrifugal separator De Laval, type BRPX 213–35S). The bacterial cell paste was collected in 100 to 120 kg. portions. To each portion was added 3.0 percent of methylisobutyl ketone and the mixture was then homogenized by means of an Ultra Turrax stirrer (type T110/2M0 for 25 minutes. The total yield of bacterial mass was 325 kg.

Analysis of the enzyme in the different production steps gave the following figures in acylase units determinative of the amount enzyme remaining during the particular step (one acylase unit corresponds to the amount of enzyme capable of splitting in 1.5 hours at pH 8.5 and 37° C. an amount of benzylpenicillin equivalent to 1 mg. of 6-aminopenicillanic acid):

| | | |
|---|---|---|
| Production fermentation culture | U/ml | 5 |
| Supernatant liquid | U/ml | 0.33 |
| Centrifugal separator liquid effluent | U/ml | 0.28 |
| Bacterial cell paste | U/g | 212 |
| Supernatant liquid in paste, before homogenization | U/g | 75 |
| Supernatant liquid in paste, after homogenization | U/g | 123 |

Cell-free extracts for subsequent use were prepared from the homogenized mass.

PREPARATION OF STARTING MATERIALS OF THE FORMULA III

EXAMPLE 3

Preparation of DL-N-phenylacetyl-3-(3-methoxyphenyl)-alanine (a) 4-(3-Methoxybenzylidene)-2-benzyloxazolone-5.— N-Phenylacetylglycine (41.8 g., 0.216 mole) and 3-methoxybenzaldehyde (46.5 g., 0.342 mole) were added to a mixture of dry sodium acetate (13.2 g.) in acetanhydride (54 ml.). After heating for one hour on a water bath the mixture was poured into 140 ml. of ice water and the substance formed was extracted with ethyl acetate. After evaporation and drying the remainder was triturated with ethanol, filtrated, washed with water and dried. Melting point 104.5°–105° C. (ethanol). Analysis: C, 73.57%; H, 5.26%; N, 4.69%; O, 16.50%; calculated for $C_{18}H_{15}NO_3$: C, 73.71%; H, 5.15%; N, 4.78%; O, 16.36%.

(b) α-Phenylacetylamido-m-methoxy cinnamic acid.— 4-3-(Methoxybenzylidene)-2-benzyloxazolone-5 (39 g.) was suspended in a mixture of 326 ml. acetone, 115 ml. water and 3.25 ml. 2 N hydrochloric acid and was boiled for 3 hours. The solvent was evaporated and the remainder dissolved by addition of sodium bicarbonate. After washing with ethylacetate, the water phase was acidified to a pH between 2 and 3 and the precipitating product was collected. Melting point 186.5°–190.5° C. (ethanol). Analysis: C, 69.32%; H, 5.67%; N, 4.32%; O, 20.71%; calculated for $C_{18}H_{17}NO_4$: C, 69.44%; H, 5.51%; N, 4.50%; O, 20.56%.

(c) DL - N - Phenylacetyl - 3 - (3 - methoxyphenyl)-alanine.—α-Phenylacetylamido - m - methoxy cinnamic acid (16 g.) was hydrogenated at normal pressure in 320 ml. of ethanol using 10 percent Pd-C as catalyst until the theoretical amount of hydrogen had been absorbed. After separating of the catalyst and the solvent, the product was obtained in the form of white crystals. Melting point 130°–132.5° C. (chloroform). Analysis: C, 68.83%; H, 6.29%; N, 4.57%; O, 20.51%; calculated for $C_{18}H_{19}NO_4$: C, 68.99%; H, 6.11%; N, 4.47%; O, 20.42%.

EXAMPLE 4

Preparation of N-phenlacetyl-3-(3,4-methylenedioxyphenyl)-alanine (a) 2 - Benzyl - 4 - (3,4 - methylenedioxybenzylidene)-oxazolone-5 was prepared as is described in Example 3a using 98 g. of piperonal, 85 g. of N-phenylacetylglycine, 105 ml. of acetanhydride and 27 g. of water-free sodium acetate as starting materials. The product obtained had the melting point 146°–147° C. (ethanol) and an NMR spectrum in agreement with the structure.

(b) α-Phenylacetamido - 3,4-methylenedioxy cinnamic acid was prepared in an analogous way according to the process described in Example 3b using 2-benzyl-4-(3,4-methylenedioxybenzylidene)-oxazolone-5 (36 g.), acetone (240 ml.), water (105 ml.) and 2 N hydrochloric acid (3 ml.) as starting material. The product obtained has the melting point 197°–200° C. (ethanol) and an NMR spectrum corresponding to the structure.

(c) N - phenylacetyl - 3-(3,4-methylenedioxyphenyl)-alanine was prepared as is described in Example 3c using 55 g. α - phenylacetamido - 3,4-methylenedioxy cinnamic acid together with 10% Pd/C (5.5 g.) in 1000 ml. ethanol as catalyst. The hydrogenation gave a final product with a melting point 154°–158° C. (ethanol/water) and an NMR spectrum corresponding to the structure. Analysis: C, 65.94%; H, 5.08%; N, 4.37%; O, 24.60%; calculated for $C_{18}H_{17}NO_5$: C, 66.05%; H, 5.24%; N, 4.28%; O, 24.44%.

EXAMPLE 5

Preparation of N-phenylacetyl-3-(3,4-dimethoxyphenyl)-alanine (a) 2 - Benzyl - 4 - (3,4 - dimethoxybenzylidene)-oxazolone-5 was prepared as described in Example 3a by reacting N-phenylacetylglycine (200 g.) and 3,4-dimethoxybenzaldehyde (256 g.) in acetanhydride/sodiumacetate (246 g./46 g.). Melting point 154°–155.5° C. (acetone/ethanol) and an NMR spectrum in agreement with the structure.

(b) α - Phenylacetamido - 3,4-dimethoxycinnamic acid was obtained from 2 - benzyl - 4 -(3,4-dimethoxybenzylidene)-oxazolone-5 (69 g.) in the same way as is described in Example 3b. Melting point 211°–217° C. (ethanol) and an NMR spectrum in agreement with the structure.

(c) N - Phenylacetyl - 3 - (3,4 - dimethoxyphenyl)-alanine was obtained as is described in Example 3c from α-phenylacetamido - 3,4-dimethoxycinnamic acid (70 g.) in ethanol (1.6 l.) and 10 percent Pd/C (7 g.). Melting point 145.5°–149.5° C. (chloroform) and an NMR spectrum in agreement with the structure.

EXAMPLE 6

Preparation of N-phenylacetyl-3-(3,4-dihydroxyphenyl)-alanine (a) Ethyl N - phenylacetyl - 3-(3,4-dihydroxyphenyl)-alaninate.—To an ice-chilled mixture of ethyl 3-(3,4-dihydroxyphenyl)-alaninate hydrochloride (8.3 g.) in oxygen-free methylenechloride (250 ml.) in an argon atmosphere, triethylamine (8.7 ml.) and phenylacetylchloride (4.2 ml.) in 35 ml. methylene chloride were added successively with stirring. After one hour at 25° C. the mixture was poured into 100 ml. of water; the organic layer was separated and washed successively with 2 N $H_2SO_4$, 1M $KHCO_3$, water and brine. After drying and evaporation of the solvent, an oily residue (7.1 g.) was obtained.

(b) N - phenylacetyl - 3 - (3,4 - dihydroxyphenyl)-alanine.—A mixture of ethyl N - phenylacetyl-3-(3,4-dihydroxyphenyl)-alaninate (7.1 g.) in 2 N NaOH (32 ml.) was stirred for 2 hours at about 25° C. The resulting clear solution was washed with ethyl acetate, acidified to Ph 2 with concentrated $H_2SO_4$ and extracted with ethyl acetate. The organic layer was washed with brine, dried and evaporated leaving the product, N-phenylacetyl-3-(3,4-dihydroxyphenyl)-alanine, as a brown oil in an almost quantitative yield.

EXAMPLE 7

Preparation of N-phenylacetyl-3-(3-methoxyphenyl)-alanine

Phenylacetylchloride (6.6 ml.) in ether (20 ml.) was added dropwise to a stirred and ice-chilled mixture of 3-methoxyphenylalanine ½ $H_2O$ (10.2 g.) in water (250 ml.) and ether (20 ml.) while the pH was maintained at 11.5 with 5 N NaOH. The aqueous phase was separated, washed with ether and acidified to pH 2 with concentrated HCl. The crystalline product which precipitated was collected and washed with water and ether. Melting Point 130°–133° C. ($CHCl_3$).

EXAMPLE 8

Preparation of N-Phenylacetyl-3-(3,4-methylenedioxyphenyl)-alanine

N - phenylacetyl - 3 - (3,4 - methylenedioxyphenyl)-alanine was prepared as described in Example 7 starting with 3 - (3,4-methylenedioxyphenyl)-alanine and phenylacetylchloride. The product was identical with that obtained in Example 4c.

EXAMPLE 9

Preparation of N-(4-fluorophenyl-acetyl)-3-methoxyphenyl-alanine

N - (4-Fluorophenylacetyl)-3 - methoxyphenyl-alanine was obtained as described for the parent N-phenyl-acetyl compound (Example 7) starting with 3-methoxyphenylalanine (7.8 g.) and 4-fluorophenylacetylchloride (6.9 g.) white crystals. Melting Point 115°–120° C. ($CHCl_3$).

EXAMPLE 10

Preparation of N-(4-nitrophenylacetyl)-3-methoxyphenyl-alanine

N-(4-Nitrophenylacetyl) - 3 - methoxyphenyl - alanine was obtained as described for the parent N-phenylacetyl compound (Example 7) starting with 3-methoxyphenylalanine (7.8 g.) and p-nitrophenylacetylchloride (8.0 g.). Light yellow crystals. Melting point 145°–147° C. ($CHCl_3$).

EXAMPLE 11

Preparation of N-phenylacetyl-3-(3-methoxy-4-hydroxyphenyl)-alanine

To 3-(3-methoxy-4-hydroxyphenyl) - alanine (2.11 g., 0.01 mole) in 50 ml. water and 10 ml. ether was added under stirring and ice-cooling phenylacetyl chloride (1.4 ml., 0.01 mole) in 10 ml. ether whereby the pH value was kept at 11.5. The water phase was separated, washed twice with ether and acidified to pH 1–2. The mixture was cooled for 2–5 hours, the precipitated product was collected, dried and washed with some chloroform. Melting point 172°–173° C. (acetone). Analysis: C, 65.54%; H, 5.96%; N, 4.24%; O, 24.36%; calculated for $C_{18}H_{19}NO_5$: C, 65.64%; H, 5.81%, N, 4.25%; O, 24.49%.

EXAMPLE 12

Preparation of N-phenylacetyl-m-tyrosine

A mixture of ethyl N-phenylacetyl-m-tyrosinate, the structure of which was confirmed with NMR spectroscopy, (0.05 mole) in 2 N NaOH (75 ml., 0.15 mole) was stirred for 2 hours at about 25° C. The resulting clear solution was washed with ethyl acetate, acidified to pH 2 with concentrated $H_2SO_4$ and extracted with ethyl acetate. The organic layer was washed with brine, dried and evaporated leaving the product as a yellow oil in an almost quantitative yield. The NMR spectrum was consistent with the structure and in thin layer chromatography only one spot was detected (ethanol).

ENZYMATIC RESOLUTION OF COMPOUNDS OF FORMULA III

EXAMPLE 13

Resolution of DL-N-phenylacetyl-3-(3,4-methylenedioxyphenyl)-alanine

L(—) - 3 - (3,4 - methylenedioxyphenyl)-alanine and D(—) - N - phenylacetyl-3-(3,4-methylenedioxyphenyl)-alanine were obtained by incubating DL-N-phenylacetyl-3-(3,4-methylenedioxyphenyl)-alanine (5 g.) with an E. coli acylase (6,000 units) in 50 ml. water at pH 7.8 whereby at regulation of pH ammonia, sodium hydroxide or lithium hydroxide was used as base. Various incubation experiments were performed and the time used varied between 1 and 72 hours and the incubation temperature varied between 25° and 37° C. When the incubation had been finished, the pH was adjusted to 1.5 with 2 N hydrochloric acid or sulphuric acid, whereafter remaining nonresolved phenylacetylated amino acid was extracted with ethyl acetate. The remaining water phase was concentrated and gave, after adjusting the pH to 5.5, a L(—)amino acid which was no longer protected at the amino nitrogen, in the form of white crystals with the melting point of 202°–210.5° C. (water) $[\alpha]_D^{20}=-28.12°$ (water, c.=1). Analysis: found C, 57.53%; H, 5.26%; N, 6.82%; O, 30.70%; calculated for $C_{10}H_{11}NO_4$: C, 57.41%; H, 5.30%; N, 6.70%; O, 30.59%. The ethyl acetate phase contained the N-phenylacetylated D(—) amino acid which had a melting point of 143°–157° C. (ethanol) $[\alpha]_D^{20}=-59.46°$ (ethyl acetate, c.=1).

EXAMPLE 14

Resolution of DL-N-phenylacetyl-3-(3-methoxyphenyl)-alanine

L-(—)-3-(3-methoxyphenyl)-alanine and D(—)-N-phenylacetyl - 3 - (3 - methoxyphenyl)-alanine was prepared in the same way as described in Example 13 above. The starting material was DL-N-phenylacetyl-3-(3-methoxyphenyl)-alanine (5 g.) and the resolution was performed by 4 ml. E. coli acylase (6,000 units). Hereby the L(—) amino acid, with no protecting groups attached, was obtained as monohydrate with a melting point of 173°–176.5° C.: $[\alpha]_D^{20}=-27.81°$ (water, c.=1). Analysis: found C, 56.18%; H, 6.98%; N, 6.70%; O, 30.01%; calculated for $C_{10}H_{13}NO_3H_2O$: C, 56.33%; H, 7.09%; N, 6.57%; O, 30.02%. The D(—)-N-phenylacetylated amino acid had the melting point 117.5°–133° C.; $[\alpha]_D^{20}=43.93°$ (ethyl acetate, c.=1).

EXAMPLE 15

Resolution of DL-N-phenylacetyl-3-(3,4-dimethoxyphenyl)-alanine

L-(—)-3-(3,4-dimethoxyphenyl)alanine was prepared by incubation of DL-N-phenylacetyl-3-(3,4-dimethoxyphenyl)-alanine (5 g.) in water (73 ml.) at pH 6.5 or 7.0 ($NH_3$ as base) with cell-free E. coli acylase (6,650 units) for 3 hours. The mixture was thereafter stirred for some minutes with hyflo and active carbon and filtrated. The pH of the filtrate was adjusted to 2.3–3 with sulphuric acid and the precipitated D(—)-N-phenylacetyl-3-(3,4-dimethoxyphenyl)alanine was extracted with ethyl acetate, the water phase was evaporated to about 5 ml. and the pH value was raised to 6.5. The product L-(—)-3-(3,4-dimethoxyphenyl)-alanine precipitated as white crystals; $[\alpha]_D^{20}=-5.64°$ (N HCl, c.=1). Melting point 209°–214.5° C., from the ethylacetate phase the D(—) form of the phenylacetylated amino acid was obtained, melting point 117°–142° C.; $[\alpha]_D^{20}=-49.75°$ (ethyl acetate, c.=1).

EXAMPLE 16

Resolution of DL-N-phenylacetyl-3-(3-methoxyphenyl)-alanine

L(—)-3-(3 - methoxy)-alanine and D(—)-N-phenylacetyl-3-(3-methoxyphenyl)-alanine were prepared by incubation of DL-N-phenylacetyl - 3-(3-methoxyphenyl)-alanine (10 g.) with cell-free E. coli acylase (2,145 units) in water (160 ml.) at pH 6.5 ($NH_3$ as base) for 3.25 hours at a temperature of 45° C. The mixture was thereafter stirred for some minutes with hyflo and active carbon and filtrated. The pH of the filtrate was adjusted to 2.6 with concentrated sulphuric acid and the mixture was extracted with ethyl acetate. The water phase was evaporated in a roll-evaporator to about 15 ml. and the pH value was adjusted to 6.5. The precipitated L(—) amino acid was obtained by filtration $[\alpha]_D^{20}=-6.18°$ (N HCl, c.=1). The ethyl acetate phase was washed neutral, dried and evaporated. The remainder was treated with ether whereby the D(—) form of the N-phenylacetylated amino acid precipitated as white crystals $[\alpha]_D^{20}=-44.93$ (ethyl acetate, c.=1) $[\alpha]_D^{20}$ after one recrystallization from ethylacetate —51.35° (ethyl acetate, c. =1).

EXAMPLE 17

Resolution of DL-N-phenylacetyl-3-(3-methoxy-4-hydroxy-phenyl)-alanine

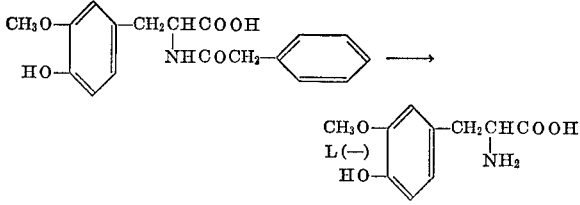

L(—)-(3-methoxy-4-hydroxyphenyl)-alanine

A solution of N-phenylacetyl-3-(3-methoxy-4-hydroxyphenyl)-alanine (3.29 g., 0.01 mole) in 100 ml. of 0.2 M $Na_2HPO_4$ and E. coli acylase in various amounts according to Table I where incubated at different pH values according to Table I for 3.5 hours at 50° C. Thereafter the solution was filtered with hyflo and active carbon and the pH value was adjusted to 1.5 with concentrated sulphuric acid. The supernatant was decanted from the precipitated oil and washed with ethyl acetate. The water phase was evaporated at about 10 mm. to 25 ml. and the amino acid was precipitated by adjusting the pH to 5.5.

The oil which first was precipitated from the water phase and the ethyl acetate phase were pooled and the solvent removed under vacuum. The remainder was stirred with chloroform and the crystallized D(—)-N-phenylacetyl-3-(3-methoxy-4-hydroxyphenyl)-alanine was obtained by filtration. The reaction conditions were varied as indicated in Table I whereby the results indicated were obtained.

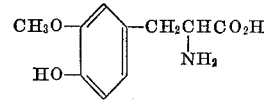

TABLE I

| pH | Units of acylase,* 0.01 mole substrate | $[\alpha]_D^{20}$ (C=2 N HCl) | Yield, percent** |
|---|---|---|---|
| 6.25 | 1,500 | −5.74 | 68.6 |
| 6.25 | 1,750 | −5.78 | 85.2 |
| 6.50 | 1,500 | −6.06 | 83.3 |
| 6.75 | 1,500 | −5.40 | 81.4 |
| 6.75 | 1,750 | −6.10 | 76.9 |
| 7.00 | 1,500 | −5.62 | 69.4 |
| 7.10 | 1,500 | −5.89 | 71.1 |
| 7.25 | 1,750 | −6.47 | 75.6 |
| 7.50 | 1,500 | −5.99 | 49.7 |
| 7.75 | 1,500 | −6.02 | 34.1 |
| 8.00 | 1,500 | −6.04 | 30.0 |

*1 acylase unit is the amount of enzyme which at 35° C. produces ½ mg. of 6-aminopenicillanic acid from benzyl penicillin during 90 min.
**Reaction of half the racemic amount of substrate was calculated as 100%.

EXAMPLE 18

Resolution of DL-N-phenyl-acetyl-m-tyrosine

L-(—)-m-Tyrosine.—To a solution of N-phenyl-acetyl-m-tyrosine (6 g., 0.02 mole) in 0.025 M $Na_2HPO_4$ at pH 6.75 (pH set with 2 N NaOH), 3000 units of acylase were added and the mixture incubated for 4 hours at 40° C. Then the solution was charcoaled, acidified to pH 2 with concentrated $H_2SO_4$ and washed with ethyl acetate. The aqueous phase was concentrated to 17 ml. and the product was precipitated at pH 5 with concentrated ammonia. After chilling for 15 hours at 4° C. the L-(—)-m-tyrosine was collected by filtration. $[\alpha]_D^{20} = -9.25°$ (c. 2, N HCl), water content 1.7%.

The ethyl acetate phase yielded after evaporation the unhydrolyzed D-(—)-N-phenylacetyl-m-tyrosine.

EXAMPLE 19

Resolution of DL-N-phenylacetyl-3-(3-methoxy-4-hydroxyphenyl)-alanine

L-(—)-3-Methoxy-4-hydroxyphenylalanine.—To a solution of N-phenylacetyl-3-(3-methoxy-4-hydroxyphenyl)-alanine (3.29 g.) in 0.025 M $Na_2HPO_4$ at pH 6.75 (pH set with 2 N NaOH) 1500 units of acylase were added and the mixture incubated at 50° C. for 3.5 hours. Then the solution was charcoaled, acidified to pH 2 with concentrated $H_2SO_4$ and washed with ethyl acetate. The aqueous phase was concentrated to 20 ml. and the product was precipitated at pH 5–6 with concentrated ammonia. After chilling for 15 hours at 4° C., the L-(—)-3-methoxy-4-hydroxyphenylalanine was collected by filtration.

$[\alpha]_D^{20} = -5.27°$ (c. 2, N HCl), water content 8.7%.

The ethyl acetate phase yielded after evaporation the unhydrolyzed D-(—)-N-phenylacetyl - 3 - (3-methoxy-4-hydroxyphenyl)-alanine which could be racemized and used again for the stereospecific enzymic hydrolysis.

EXAMPLE 20

Resolution of DL-N-(4-fluorophenylacetyl)-3-methoxyphenylalanine and DL-N-(4-nitrophenylacetyl)-3-methoxyphenyl-alanine L-(—)-3-Methoxyphenylalanine was prepared in the same manner as described for L-(—)-3-methoxy-4-hydroxyphenylalanine (Example 19) starting with N-(4-fluorophenylacetyl) - 3 - methoxyphenylalanine or N-(4-nitrophenylacetyl) - 3 - methoxyphenylalanine respectively and acylase. The product obtained was identical with the product obtained in Example 15.

EXAMPLE 21

Resolution of DL-N-phenylacetyl-3-(3,4-dihydroxyphenyl)-alanine

L-(—)-3-(3,4-Dihydroxyphenyl)-alanine and D-(—)-N-phenylacetyl - 3 - (3,4-dihydroxyphenyl)-alanine were obtained as described for the corresponding 3-hydroxy derivatives starting with N-phenylacetyl-3-(3,4-dihydroxyphenyl)-alanine and E. coli acylase and executing the reaction in an oxygen free argon atmosphere. The L-(—)-3-(3,4-dihydroxyphenyl)-alanine thus obtained had an optical rotation $[\alpha]_D^{20}$ of $-10.57°$ (c. 2, N HCl) and the D-(—)-N-phenylacetyl - 3 - (3,4-dihydroxyphenyl)-alanine measured $[\alpha]_D^{20} = -35.0°$ (c. 1, ethyl acetate).

HYDROLYSIS OF L(—)-ISOMERS

EXAMPLE 22

Hydrolysis of L(—)-3-(3-methoxyphenyl)-alanine

L(—)-m-tyrosine was obtained by refluxing a mixture of L(—)-3-(3-methoxyphenyl)-alanine (1 g.) at constant temperature boiling 57 percent hydroiodic acid (5 ml.), glacial acetic acid (5 ml.) and 0.33 g. red phosphorous during 3 hours under argon atmosphere. Thereafter the mixture was filtered and evaporated repeatedly with water. The crystalline remainder finally obtained was dissolved in a small amount of water and the pH was adjusted to 5–6. White crystals precipitated which, after recrystallization from water, had a melting point of 243°–259° C.; $[\alpha]_D^{20} = -8.4°$ (2 N HCl, c.=1). Analysis: C; 59.42%; H, 6.78%; N, 7.59%; O, 26.44%; calculated for $C_9H_{12}NO_3$: C, 59.33%; H, 6.64%; N, 7.69%; O, 26.35%.

EXAMPLE 23

Hydrolysis of L(—)-3-(3,4-methylenedioxyphenyl)-alanine

L(—)-3-(3,4-dihydroxyphenyl)-alanine was obtained by boiling 1.5 g. L(—)-3-(3,4-methylenedioxyphenyl)-alanine in a mixture (1:1) of 57% hydroiodic acid and acetic acid anhydride (20 ml.) and red phosphorous (4 g.) under argon atmosphere during 3 hours. Thereafter the mixture was filtered, cooled and evaporated several times with water under argon atmosphere and reduced pressure. The remainder together with 10 ml. water was filtered whereupon pH was adjusted to 4.5 with ammonia under simultaneous supplying of argon to the mixture. 10 ml. hexane was added and after cool storing for 12 hours, the product was collected. The substance obtained had the melting point 276°–278° C.

EXAMPLE 24

Hydrolysis of L(—)-3-(3-methoxy-4-hydroxyphenyl)-alanine

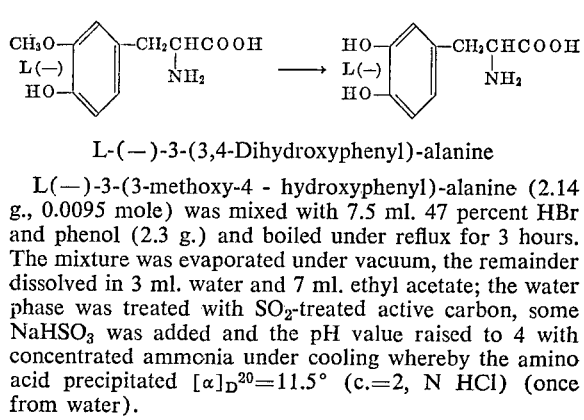

L-(—)-3-(3,4-Dihydroxyphenyl)-alanine

L(—)-3-(3-methoxy-4 - hydroxyphenyl)-alanine (2.14 g., 0.0095 mole) was mixed with 7.5 ml. 47 percent HBr and phenol (2.3 g.) and boiled under reflux for 3 hours. The mixture was evaporated under vacuum, the remainder dissolved in 3 ml. water and 7 ml. ethyl acetate; the water phase was treated with $SO_2$-treated active carbon, some $NaHSO_3$ was added and the pH value raised to 4 with concentrated ammonia under cooling whereby the amino acid precipitated $[\alpha]_D^{20} = 11.5°$ (c.=2, N HCl) (once from water).

We claim:

1. A process for the preparation of optically active substances of the formula:

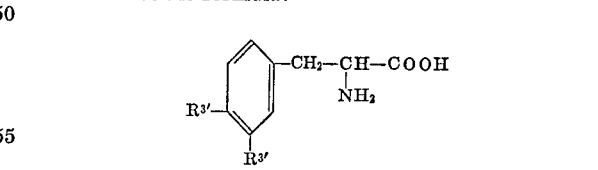

wherein $R^{2'}$ is a member of the class consisting of hydroxy and alkoxy groups of up to 5 carbon atoms and wherein $R^{3'}$ is a member of the class consisting of hydrogen, hydroxy and alkoxy groups of up to 5 carbon atoms; or wherein $R^{2'}$ together with $R^{3'}$ designate an alkylenedioxy group with 1 to 2 carbon atoms; said process comprising hydrolyzing a precursor of the formula

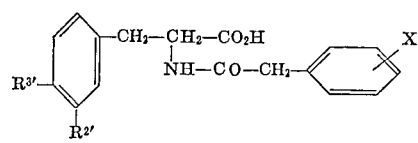

wherein $R^{2'}$ and $R^{3'}$ have the meaning specified above and X is a member of the group consisting of hydrogen, fluorine, chlorine, bromine and $-NO_2$, with a stereoselectively active E. coli acylase to the formation of the L(—) form of a compound of the formula

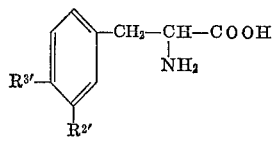

wherein $R^{2'}$ and $R^{3'}$ have the meaning specified above, said hydrolysis being performed at a pH of between 6 and 8 and at a temperature of between 0 and 60° C. for a period of time up to 72 hours.

2. A process according to claim 1 wherein said hydrolysis time is between about 1 hour and 20 hours.

3. A process according to claim 1 wherein the temperature of hydrolysis is between about 20° and 45° C.

4. A process according to claim 1 wherein said precursor is present in a concentration of between about 0.001 and about 1 mole per liter of reaction solution.

5. A process according to claim 1 wherein said optically active compound is recovered from the reaction solution and the groups $R^{2'}$ and $R^{3'}$ are transformed into hydroxy groups.

6. A process according to claim 1 wherein the pH after hydrolysis is adjusted to between about 1 and 3 and the nonresolved N-acylamino acid is extracted with an organic solvent after which the L(—) amino acid formed is isolated.

7. A process for the preparation L-Dopa and L-m-Tyrosine, said process comprising hydrolyzing a precursor of the formula

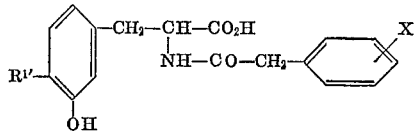

wherein $R^1$ is selected from the group consisting of hydrogen or hydroxy and X is a member of the group consisting of hydrogen, fluorine, chlorine, bromine and $-NO_2$, with a stereoselectively active E. coli acylase to the formation of L-Dopa when $R^1$ is hydroxy and L-m-Tyrosine when $R^1$ is hydrogen, said hydrolysis being preformed at a pH of between 6 and 8 at a temperature of between 0 and 60° C. for a period of time up to 72 hours.

8. A process according to claim 7 wherein said hydrolysis time is between about 1 hour and 20 hours.

9. A process according to claim 7 wherein the temperature of hydrolysis is between about 20° and 45° C.

10. A process according to claim 7 wherein said precursor is present in a concentation of between about 0.001 and about 1 mole per liter reaction solution.

11. A process according to claim 7 wherein the pH after hydrolysis is adjusted to between about 1 and 3 and the nonresolved N-acylamino acid is extracted with an organic solvent after which the L(—) amino acid formed is isolated.

References Cited
UNITED STATES PATENTS

| | | | |
|---|---|---|---|
| 3,321,470 | 5/1967 | Howell et al. | 260—240 F |
| 3,637,804 | 1/1972 | Hegedus et al. | 260—240 F |
| 3,669,837 | 6/1972 | Parcell | 195—29 |
| 3,290,225 | 12/1966 | Rauenbusch et al. | 195—29 |

A. LOUIS MONACELL, Primary Examiner

R. J. WARDEN, Assistant Examiner

U.S. Cl. X.R.

195—28, 30

PO-1050
(5/69)

UNITED STATES PATENT OFFICE
CERTIFICATE OF CORRECTION

Patent No. 3,838,008            Dated  September 24, 1974

Inventor(s)   Peter Bamberg et al

It is certified that error appears in the above-identified patent and that said Letters Patent are hereby corrected as shown below:

"

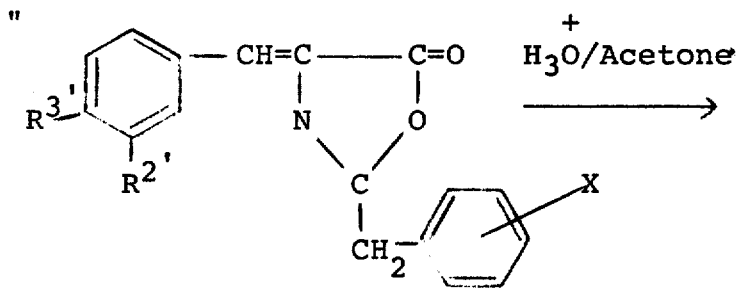

should read --

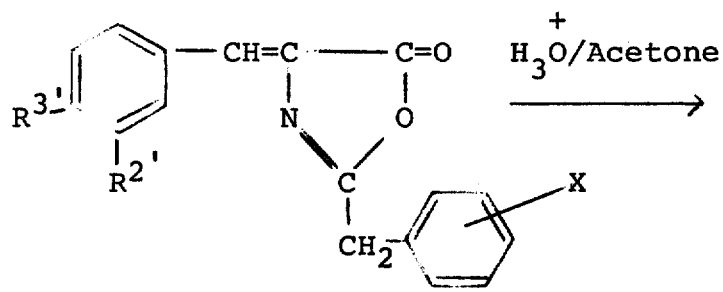

Col. 3, Line 26, "R" should read --$R^2$-- (the printed "$R^2$" is illegible)
Col. 3, Line 56, "Br" should read -- Cl --
Col. 6, Line 55, "4-3-(Methoxybenzylidene)" should read -- 4-(3-Methoxybenzylidene) --
Col. 7, Line 1, "N-phenlacetyl-3-" should read -- N-phenylacetyl-3-
Col. 8, Lines 33 and 34, "(6.9g.) white" should read -- (6.9g.). White --
Col. 10, Line 4, "methoxy)-alanine" should read -- methoxyphenyl)-alanine --

PO-1050
(5/69)

UNITED STATES PATENT OFFICE
CERTIFICATE OF CORRECTION

Patent No. 3,838,008      Dated September 24, 1974

Inventor(s) Peter Bamberg et al      Page 2

It is certified that error appears in the above-identified patent and that said Letters Patent are hereby corrected as shown below:

Col. 12, Line 56, "$R^{3'}$" should read -- $R^{2'}$ --
Col. 12, Line 66, the second "$CH_2$" should read -- $CH$ --

Signed and sealed this 13th day of May 1975.

(SEAL)
Attest:

RUTH C. MASON
Attesting Officer

C. MARSHALL DANN
Commissioner of Patents
and Trademarks